(No Model.)
C. YOUNG.
BICYCLE.
No. 584,807.
Patented June 22, 1897.
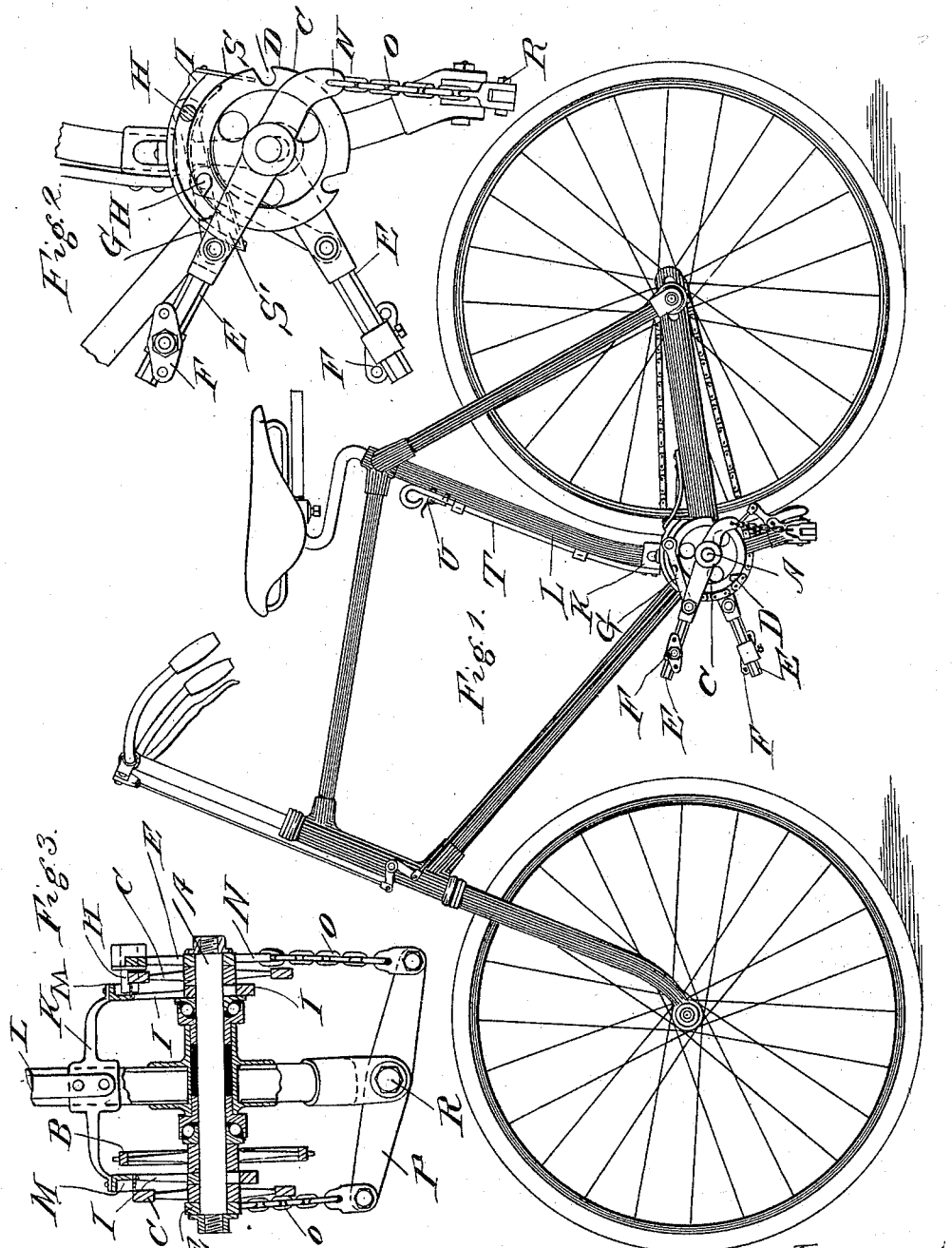
Witnesses:
D. J. Ireland.
Charles B. Byrnah
Inventor:
Carl Young
By Francis M. Ireland.
his Att'y

UNITED STATES PATENT OFFICE.

CARL YOUNG, OF CHICAGO, ILLINOIS.

BICYCLE.

SPECIFICATION forming part of Letters Patent No. 584,807, dated June 22, 1897.

Application filed September 8, 1893. Serial No. 485,063. (No model.)

*To all whom it may concern:*

Be it known that I, CARL YOUNG, a citizen of the United States, residing at Chicago, in the county of Cook and State of Illinois, have invented a new and useful Improvement in Bicycles, of which the following is a full, clear, and exact specification.

My invention relates to bicycles, particularly to that class known as "safeties," and has for its object to provide a bicycle to which the power may be evenly and continuously applied.

In the ordinary form of bicycle, in which the pedals are upon cranks which turn a sprocket-wheel and the pedals and foot of the rider must move through a complete revolution, there is a dead-point at the beginning and end of each downward stroke, and through a very considerable portion of each downward stroke the power is very inefficiently applied and is maximum only at the center of the stroke. The result is that it is nearly or quite impossible to run the machine up a steep grade, as the momentum acquired during the most efficient portion of the stroke is not sufficient to carry the wheel through the least efficient portions and past the dead-centers. To overcome these defects, I have provided a bicycle in which the pedals move upward and downward instead of through a revolution, in which there are no dead-centers, and in which the power is applied with maximum efficiency through every portion of the stroke. This I accomplish by means of the mechanism illustrated in the accompanying drawings, wherein—

Figure 1 is a side view of a bicycle. Fig. 2 is a detached side view of the driving mechanism with parts broken away. Fig. 3 is a vertical cross-section through the driving mechanism.

Like parts are indicated by the same letters in the several views.

In Fig. 1 is shown a safety-bicycle having the arrangement of wheels and frame and the location of the driving mechanism similar to bicycles in common use.

A is a shaft having the sprocket-wheel B rigidly mounted thereon to form a driving connection with the rear wheel of the machine through chain and sprocket-wheel upon the shaft of such wheel in the usual manner.

C C are driving-wheels, one upon either side, also rigidly secured upon the shaft A and having notches D D in their peripheries. Loosely mounted upon said shaft A are the bars or levers E E, having the pedals F F adjustably secured upon their outer extremities.

G G are rods pivoted at one end to the levers E E and having at the other end pins H H, adapted to engage the notches D D in the peripheries of the wheels C C.

I I are guide disks or plates supported by the frame K upon the brace L of the frame of the bicycle and at their lower portions encircling the shaft A.

M M are grooves in the faces of these disks into which the pins H H project and by which such pins are guided.

The chains O O connect the rear ends N N of the levers E E with opposite ends of the lever P, pivoted at R, so that when the pedal upon one lever is forced downward the pedal upon the other will be forced upward.

The operation of the driving mechanism is as follows: One pin H being in engagement with the notch in the periphery of its adjacent wheel C, pressure upon the pedal upon such lever will force the lever downward and carry the wheel C forward through a partial revolution, at the same time by means of chains O O and lever P forcing the other pedal upward. The spring S is provided to force the pin into the notch at the beginning of a stroke and the pin S' to force it out of the notch at the end of the stroke.

As shown in the drawings, the parts are of such relative sizes and the arrangement is such that each downward stroke carries a wheel C through one-third of a revolution, and the notches in the peripheries of the two wheels C C are oppositely arranged, so that at the same time that the pin on one side is forced out of its notch that on the other side is forced into its notch.

Of course the notches might be so spaced that the wheels C would move through a fourth or a fifth of a revolution at each stroke, instead of through a third, the only result being to lessen the length of the stroke of the pedal and in no way interfering with the essential idea of my invention.

It will be seen that the pedal-levers being pivoted concentric with the wheels C C the pull upon the periphery of each wheel will be in the same direction throughout the stroke and hence the power be applied with equal efficiency throughout the stroke.

The plate K, from which the guide-disks I I are suspended, is loose upon the brace L and is secured to the rod T, having at its upper end the catch U. In "coasting," this rod T may be pulled upward and secured by the catch. This raises the guide-disks and by means of the grooves holds the pins out of engagement with the notches in the peripheries of their wheels C C. Thus the bicycle is permitted to run freely without removing the feet from the pedals.

It is distinctly to be noted that much is herein shown and described that is not of the essence of my invention and might be altered, varied, or omitted without departing from the spirit thereof.

What I claim as new, and desire to secure by Letters Patent, is—

1. In a bicycle, a shaft which drives the bicycle, driving-wheels mounted rigidly thereon, two pedal-bars mounted loosely upon such shaft, a pivoted arm upon each of the pedal-bars having a pin adapted to engage notches in the periphery of its adjacent driving-wheel, springs to force said clutches into connection with the peripheries of the driving-wheels at the commencement of each downward stroke of the pedal-bars, and other springs to force them out of such engagement at the end of the stroke.

2. In a bicycle, driving-wheels connected with one of the principal wheels of the bicycle, pedal-bars provided with clutches by means of which they may form a driving connection with the driving-wheels, in combination with guide-plates having grooves in which such clutches move to and fro and by means of which they may be lifted out of engagement with the driving-wheels.

3. In a bicycle in which the pedal-bars are connected by clutch mechanism with the driving-wheel, the guides I and rod T adapted to be operated to withdraw such clutch mechanism from action, substantially as shown and described and for the purpose specified.

Dated August 30, 1893.

CARL YOUNG.

Witnesses:
H. S. GILMAN,
FRANK S. BAKER.